United States Patent
Garcia Vizcarra et al.

(10) Patent No.: US 7,622,173 B2
(45) Date of Patent: Nov. 24, 2009

(54) MULTILAYERED CELLULOSE CASING, METHOD OF MANUFACTURE THEREOF AND EXTRUSION HEAD FOR OBTAINING SAID CASING

(75) Inventors: Agustin Garcia Vizcarra, Navarra (ES); José Abel Oiza Oset, Navarra (ES)

(73) Assignee: Viscofan, Industria Navarra de Envolturas Celulosicas, S.A., Pamplona (ES)

( * ) Notice: Subject to any disclaimer, the term of this patent is extended or adjusted under 35 U.S.C. 154(b) by 1286 days.

(21) Appl. No.: 10/247,725

(22) Filed: Sep. 16, 2002

(65) Prior Publication Data
US 2003/0072854 A1 Apr. 17, 2003

Related U.S. Application Data

(63) Continuation of application No. PCT/ES01/00051, filed on Feb. 14, 2001.

(30) Foreign Application Priority Data
Mar. 16, 2000 (ES) ................................ 200000641

(51) Int. Cl.
*A22C 13/00* (2006.01)
(52) U.S. Cl. .................... 428/34.8; 428/36.91; 428/34.9
(58) Field of Classification Search .................. 428/34.8, 428/536, 535, 534, 36.9, 36.91, 34.9, 220; 138/118; 426/105, 135
See application file for complete search history.

(56) References Cited

U.S. PATENT DOCUMENTS

| 3,334,168 A | | 8/1967 | Majewski et al. |
| 4,287,217 A | | 9/1981 | Hammer et al. |
| 4,670,273 A | * | 6/1987 | Hammer et al. ............. 426/105 |
| 5,043,194 A | * | 8/1991 | Siebrecht et al. ........... 428/34.8 |
| 5,817,381 A | * | 10/1998 | Chen et al. .................. 428/34.8 |

FOREIGN PATENT DOCUMENTS

EP  0 473952  3/1992

* cited by examiner

*Primary Examiner*—Michael C Miggins
(74) *Attorney, Agent, or Firm*—Katten Muchin Rosenman LLP

(57) ABSTRACT

Cellulose casing for sausages, comprising at least three concentric layers of regenerated cellulose, of which the two layers in contact with the outside, that is, those with the greatest and smallest diameter respectively are made of colorless, transparent viscose, and in which the internal layer or layers are made of regenerated cellulose to which is added other substances such as pigments, fumes, flavor extracts, spices or plastic proteins.

The object of the invention is a manufacturing method for the cellulose casing obtained by extrusion of at least three concentric layers of regenerated cellulose. Also object of the invention is the circular viscose extrusion head used in manufacturing the cellulose casing for sausages.

10 Claims, 6 Drawing Sheets

MULTILAYERED CELLULOSE CASING, METHOD OF MANUFACTURE THEREOF AND EXTRUSION HEAD FOR OBTAINING SAID CASING

This application is a continuation of PCT/ES01/00051 filed Feb. 14, 2001.

DESCRIPTION

1. Object of the Invention

The present invention relates to cellulose casings with several layers, reinforced or not by an internal paper sheet, as well as to the method of manufacture thereof and to the extrusion head used to obtain said multilayered cellulose casing.

2. Background of the Invention

Cellulose casings are tubes of different diameter employed in sausage manufacture.

They are produced from cellulose which is regenerated by annular extrusion of the viscose in an acid bath.

Some cellulose casings are reinforced by a hemp paper sheet which improves the constancy of diameter. These casings are particularly used when a constant diameter is an essential element of the casing, as when it is meant for use in very long sausages which are to be sliced, in which it is important that the slices obtained are identical. These casings are known as fibrous casings. In addition, these casings may be coated in PVDC in cases when impermeability is also crucial. These are used in products such as pepperoni and the like.

Casings made from cellulose which do not have the aforementioned fibrous reinforcement may have a small diameter, with caliber as high as 38, and large diameter cellulose which spans diameters greater than this. This division is informally acknowledged in the sector, although it is not an exact division. Even the meaning of each caliber may differ, as a given casing may have two different calibers depending on whether the European or US caliber measure is employed.

The main purpose of small diameter cellulose casing is use as a temporary casing for the meat emulsion stuffed into it to form the sausage. They are used in "Frankfurt", "wiener" type sausages and the like.

Once stuffed, the sausage is smoked and cooked. This cooking process makes the meat protein accumulate on the outside forming a crust which gives the sausage the appearance of having an casing. However, given the nature of the cellulose casing it is removed from the sausage before consumption. For this reason, these types of casings are known as "skinless", as they are used for skinless sausages.

In most cases the casing is removed from the sausage by the manufacturer before it is packaged and displayed to the consumers, but in some markets the casing remains on the sausage until it is sold and the consumer removes it immediately prior to consuming it.

The present invention relates mainly to non-reinforced cellulose casings, whether large or small diameter; nevertheless, it is also applicable to cellulose casings reinforced with a fibrous layer.

As described above, during manufacture of casings made from regenerated cellulose the viscous is extruded through an annular head in a coagulation and regeneration bath, producing a tube of regenerated cellulose. FIG. 1 shows a conventional head of the type used for this purpose.

The regeneration bath consists of a solution of sulphuric acid and a few salts, such as sodium sulphate. The casing then passes through several baths with different concentrations of the aforementioned chemicals, so that the casing has a time of residence sufficient to allow the regeneration reaction of the cellulose.

After this the tube produced by the regeneration is washed with hot water to remove any impurities which may remain after the regeneration process.

The casing is then plastified, with glycerin being used as the most common plastification material in the artificial casing industry.

It is then dried such as by inflation with pressurized air while the casing is exposed to hot air on the outside.

After drying the casing is moistened so that it arrives at the final stage as a smooth casing with a constant degree of moisture.

Finally it is rolled to obtain coils of several thousand meters, known in the sector as smooth casing.

Production of this casing is known in the sector and is the object of many patents, such as U.S. Pat. Nos. 2,141,776; 2,291,238; 2,477,767; 2,857,283; 2,860,052 and many others.

This smooth casing generally cannot be used by the sausage manufacturer, particularly smaller diameters, and it must normally be prepared for its use. This preparation or converting process consists of shirring or crimping the casing to obtain hollow self-supporting sticks in which the length of the casing is shortened by a factor of 100 or more, so that one of these sticks 25 cm in length may contain 25 m of casing or more.

In the shirring operation the casing is added substances which aid in the crimping process, provide the required humidity and in some cases add plastifying and peeling substances which will aid the later processing of the casing, particularly peeling off the sausage stuffed in it.

The shirring operation takes place in high-speed shirring devices, and is the object of many patents. Among these may be remarked U.S. Pat. Nos. 2,984,574; 3,451,827; 3,454,981; 3,454,982; 3,461,484; 3,988,804 or 4,818,551.

As mentioned above during the shirring the casing is moistened to the desired humidity, so that it can be shirred without breaking but without exceeding the limit beyond which the casing would adhere to the shirring mandrel, thus making the shirring operation impossible.

At the same time lubricants are added to the casing which reduce the friction between said casing and the mandrel, or between the casing and the shirring rollers. These lubricants also reduce the friction with the sausage stuffing elements when the casing is used.

Although as mentioned before the casing is separated from the sausage before packaging and presentation to the consumer, this is otherwise in some cases.

In certain cases the casing is also printed before shirring with brand names, logos or advertising which identify the sausage stuffed inside it or its manufacturer.

In the usual case in which the casing is separated from the sausage it is crucial to detect its precise peeling, which takes place in high-speed peeling devices. If part of the casing were to remain adhered to the sausage it would bring about digestive problems if undetected prior to consumption. In any event, the sausage may be rejected, resulting in increased time and cost to the manufacturer.

Occasionally, sausage manufacturers require the casing suppliers to provide casings with a color in part or all of the casing which is striking and clearly different from that of the sausage. The purpose of this color contrast is to help the visual identification of unpeeled casing segments on the sausage.

Thus, casings have been manufactured with stripes of various colors and widths, such as those described in U.S. Pat. No.

3,334,168 by Majewski. The presence of these stripes has a two-fold purpose: on one hand it helps in the identification of the correct peeling of the sausage, as mentioned above; in addition, the stripes allow to identify the type of sausage stuffed in each type of casing. This can be of importance in the internal processing of the product by the manufacturer, as well as an identification factor for the consumer if the sausage is sold without peeling the casing, as well as indicating that the striped sausage has not been peeled.

Thus, the number and color of the stripes in the casing help identify the content and nature of the sausage, while being clearly visible if the peeling is defective.

A second method of detecting casing which remains adhered to the sausage is to color the entire casing with a color which contrasts markedly with that of the sausage. Colors such as blue, red or orange would help detect the presence of casing residues remaining on the sausage.

This full coloring system has as a disadvantage that the visual inspection of the smoked color may not be carried out because of the color deformation produced by the colored casing. In order to solve this disadvantage, which furthermore is already solved by striped casings, an improvement has been made which is the object of U.S. Pat. No. 564,928, not yet granted in the United States but which is the object of European Patent 0 473 952 by Quiñones. This patent intends to protect the invention of a colorless longitudinal band and a colored part such that the colorless part allows to see the smoked color without distortion.

These products, despite providing important advantages to the state of the art at the time of their introduction, are not fully satisfactory as they do not solve all of the problems relating to manufacture of casings and sausages.

Indeed, the presence of colorants in the casing used to create the colored stripes or to color all or a majority of the casing has occasionally resulted in detachment of color particles which, despite their small size compared to that of the sausage, cause rejection by the consumer, with the ensuing costs and loss for the manufacturer.

Particles of colored casing can detach during all any stage of the manufacture and use processes.

They occasionally stain the shirring device because of the friction on the casing when it is shirred by the shirring teeth, they occasionally stain the stuffing device because of friction with the stuffing funnel on its inside and with the retainer on the outside when the sausage stuffing is stuffed under pressure inside the casing. Particles may detach on the supports of the sausage links. Finally, they can stain the sausage itself when the casing is peeled off it, as the blade which cuts the casing can cause detachments which become visible as they accumulate.

When this detachment of pigment or colored casing occurs not only is the sausage in question affected but also other sausages which arrive afterwards during the stuffing or peeling processes.

An additional problem which may occur in these fully colored casings is the risk of pigment migration, although pigments with a minimal tendency towards migration must be selected.

A third problem arising in colored casings is the tendency to slippage during rolling. The presence of the pigment on the casing reduces its adherence as the casing surface becomes very plastic. This plasticity also affects the shirring, making it more complicated.

An additional problem which sometimes appeared with casings colored with certain pigments was accumulation of sulphur on the casing, which required a faster processing.

Additionally, lumps of pigment occasionally appeared on the casing which caused it to break during drying or stuffing.

Finally, colored casings occasionally present printing problems. Depending on the pigment used, the adherence of printing inks can be hindered causing printing problems.

DESCRIPTION OF THE INVENTION

These problems are solved by the present invention, which consists of the simultaneous and concentric extrusion of at least three layers of viscose, which gives rise to regenerated cellulose in which the two outer layers, the ones with the largest and the smallest diameters, are of a viscose which provides a transparent and colorless casing, while at least one of the internal layers consists of colored regenerated cellulose.

When referring to external layers it is in the unstuffed cellulose casing, so that the layers in contact with the outside are the ones with the greatest and smallest diameters. The latter is meant to be in contact with the sausage, but at the time of the manufacture of the casing it is an external layer.

When referring to transparent and colorless casing, it must be remarked that the casing is colorless when not rolled on itself, although this casing may have a golden color when stored in large rolls or when shirred.

By extrusion head is meant the assembly of parts which contain an annular orifice through which flows the viscous towards the regeneration bath.

FIG. 4 shows a sectional view of the casing in accordance with the invention. In it the layers 15 and 16 are the external layers, while the internal layer is labeled 17 in the drawing.

The object of the present invention is a cellulose casing comprising at least three concentric layers of regenerated cellulose, of which the two layers in contact with the outside, that is the layer with the greatest and the smallest diameters are made of colorless regenerated cellulose, while the internal layer or layers are made of regenerated cellulose to which have been added other substances, such as pigments, fumes, flavor extracts, spices or plastic materials which provide the casing with properties different from those of casings made of only regenerated cellulose.

A further object of the invention is to reduce the proportion of colored casing mass by as much as 75% as compared to conventional casings, which provides a substantial economic advantage.

Another object of the invention is to reduce the negative environmental impact, which is a result of coloring only one of the cellulose layers, thereby reducing the volume of residues generated in the casing manufacture process and in the peeling of the sausage stuffed inside it.

Another object of the invention is a cellulose casing in which the extrusion of the colored regenerated cellulose of the internal layer or layers is discontinuous, so that not all of the casing is colored but instead longitudinally colored and colorless segments can be seen, with the colored segments having one or several colors.

Another object of the present invention is a cellulose casing in which the extrusion of the colored regenerated cellulose of the internal layer or layers is discontinuous, so that longitudinally colored and colorless segments can be seen, with the colored longitudinal segments forming a zigzag pattern.

Another object of the present invention is a cellulose casing in which the extrusion of the colored regenerated cellulose of the internal layer or layers is discontinuous, so that longitudinally colored and colorless segments can be seen, with the longitudinal colored areas discontinuous in a longitudinal sense with a colored segment followed by a colorless segment and vice versa.

A further object of the invention is a method of manufacturing a cellulose casing for sausages obtained by extrusion of at least three concentric layers of regenerated cellulose, of which the two layers in contact with the outside, that is the layers with the greatest and smallest diameters are made of colorless, transparent viscose, while the internal layer or layers is of colored viscose, with extrusion of the latter discontinuous so that not all the casing is colored but instead longitudinal colored and colorless portions can be seen, with the colored parts having one or more colors.

The object of the present invention is a circular extrusion head for viscose, used in production of cellulose sausage casings, which allows the simultaneous and concentric passage of at least one viscose layer to which has been added another substance, continuously or discontinuously, so that it is embedded in the center of the casing and is covered on the inside and outside of the tube by transparent regenerated cellulose.

Further objects of the present invention will become apparent throughout the present description.

DETAILED DESCRIPTION OF THE INVENTION

Figure 1:
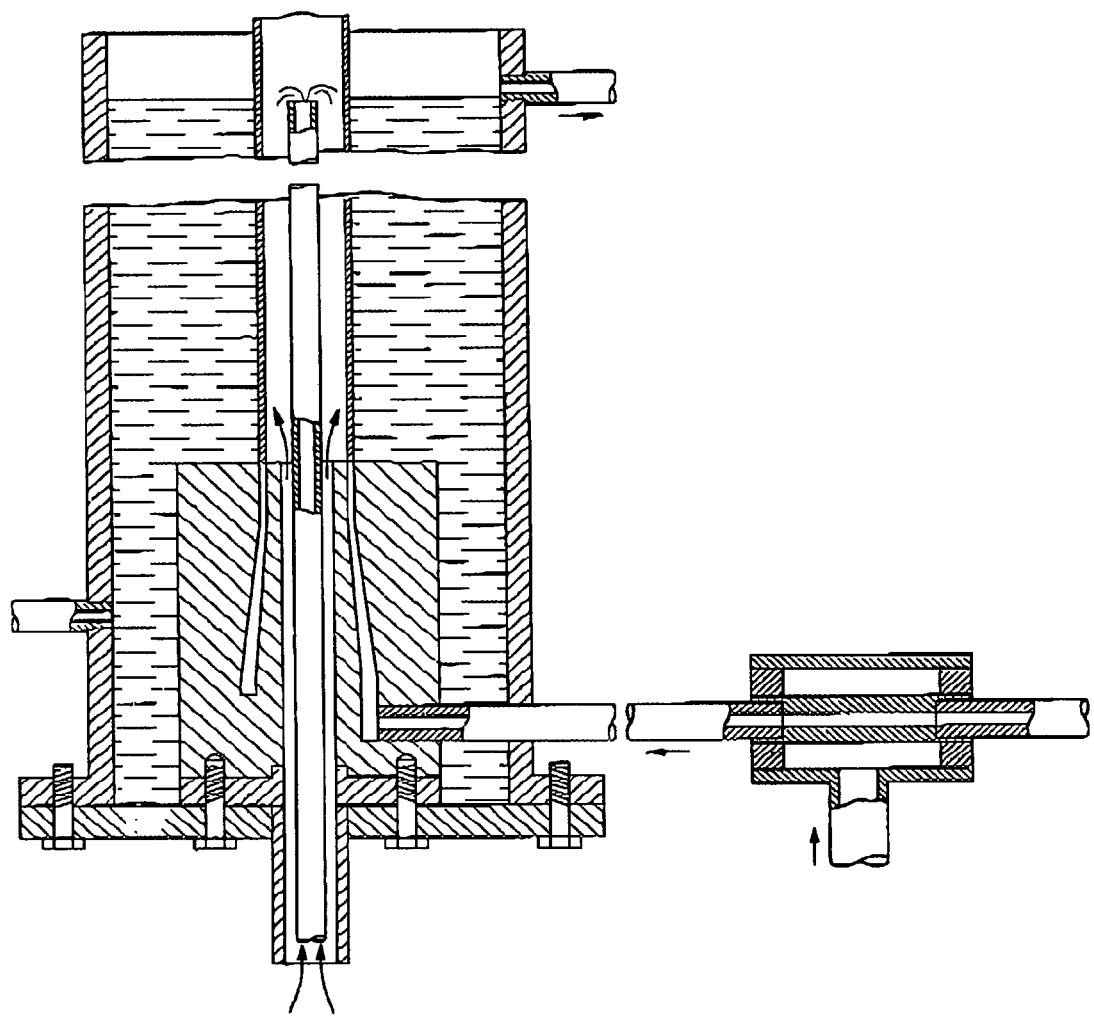
FIG. 1 shows an extrusion head such as the one described in the U.S. Pat. No. 3,334,168 by Majewski.

FIG. 1 shows a conventional extrusion head such as that described in U.S. Pat. No. 3,334,168 by Majewski, used for manufacturing regenerated cellulose casing, in which the viscose is extracted through an annular head in a coagulation and regeneration bath to produce a tube of regenerated cellulose. After this the tube produced is washed, plasticised, for example with glycerin, and dried such as by inflating with pressurized air. After drying the casing is rolled to produce coils of several thousands of meters known in the sector as smooth casing.

Production of this casing is known in the sector and is the object of many patents, such as U.S. Pat. No. 1,959,980 by Henderson. Improvements made in the appearance of the casing after peeling are provided by U.S. Pat. No. 2,141,776 by Vautier, which describes casings with colored and clear areas and the extrusion head used to produce them, in U.S. Pat. No. 2,291,238 which describes casings with colored areas in a zigzag pattern, U.S. Pat. No. 2,521,101 by Thor claiming colored casings, and U.S. Pat. No. 2,857,283 by Firth claiming a colored casing with a clear longitudinal area.

Figure 2:
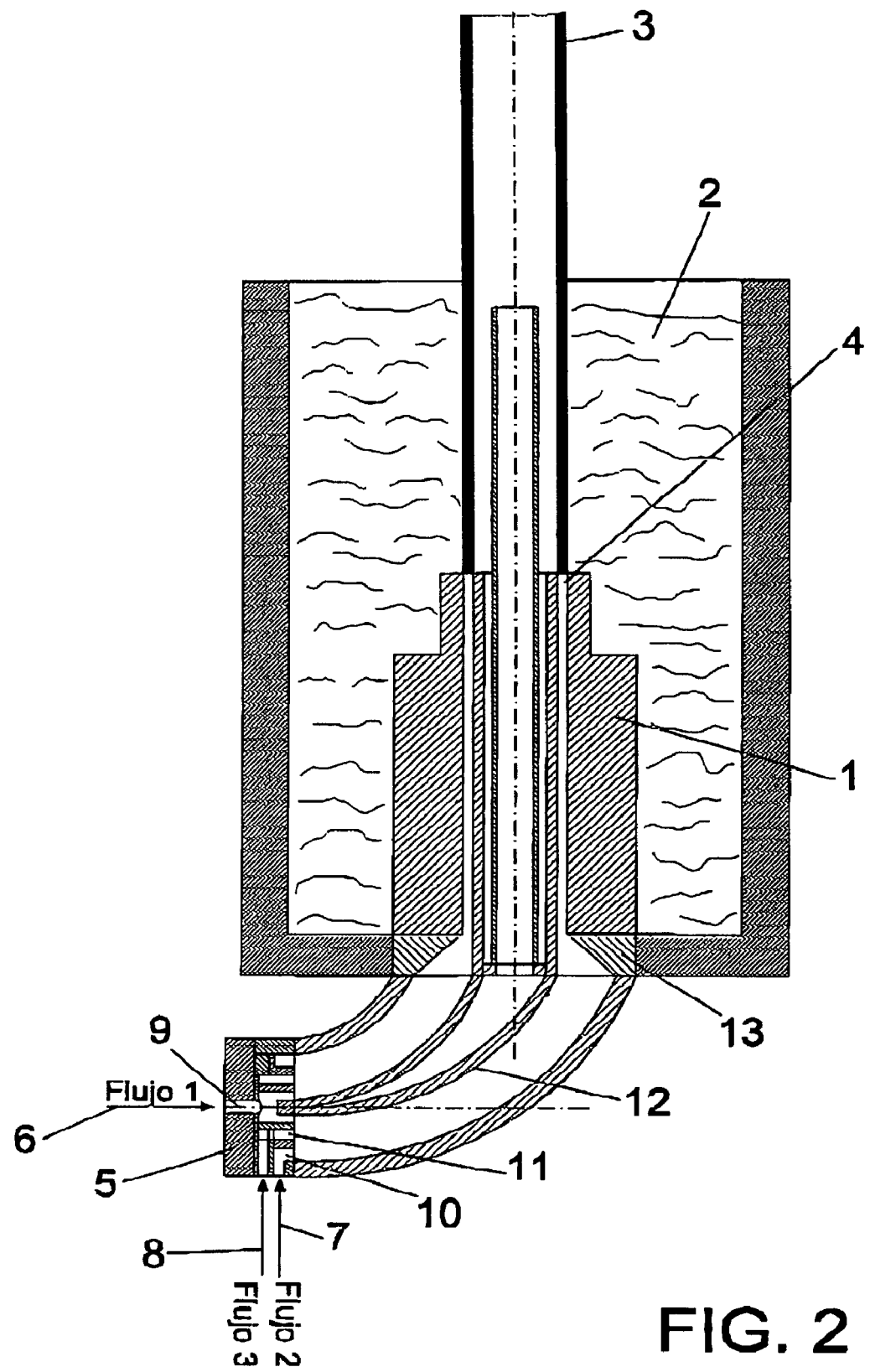
FIG. 2 shows an extrusion head which can prepare a casing in accordance with the invention.
Figure 3:
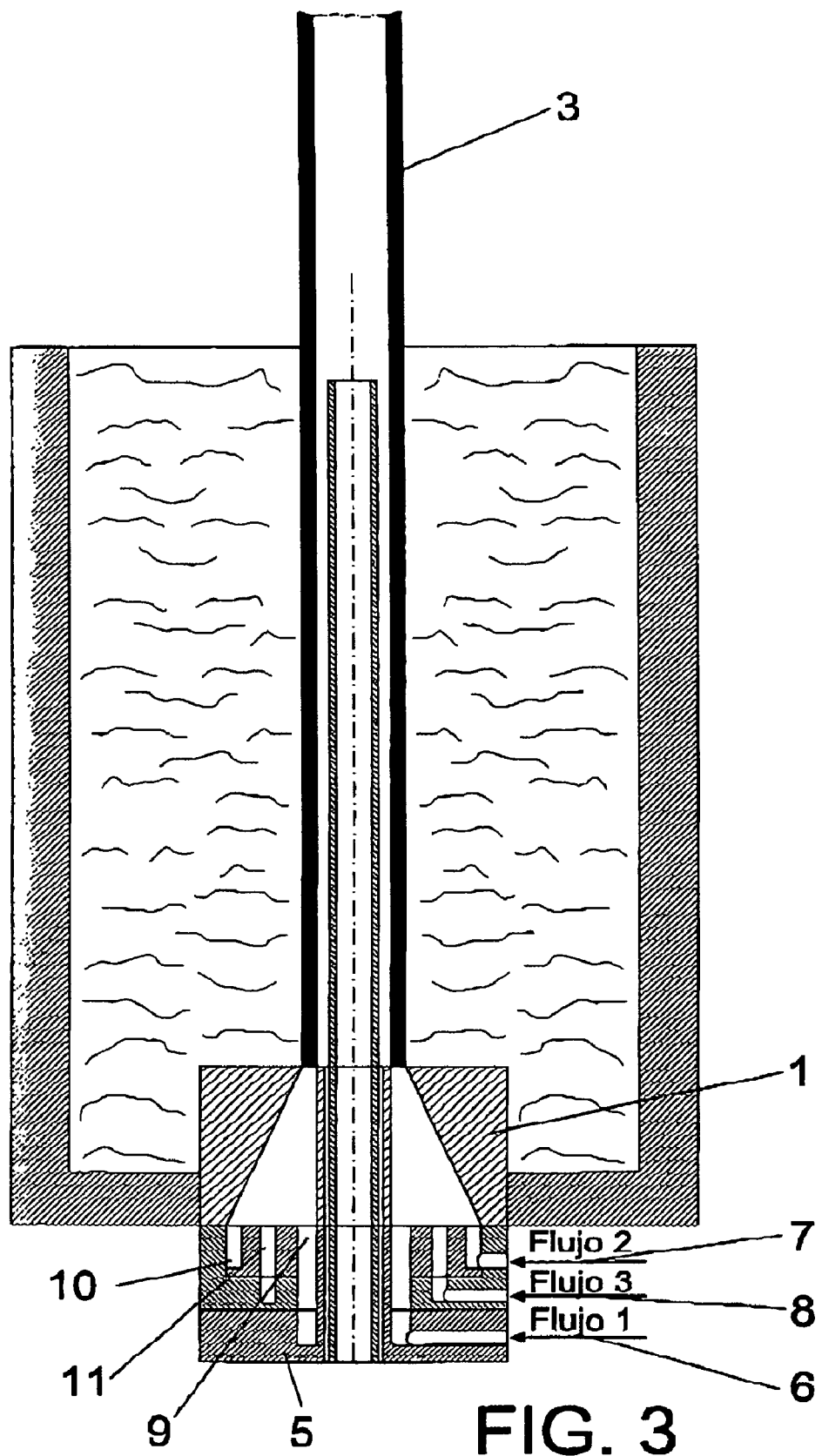
FIG. 3 shows a second example of an extrusion head which can prepare a casing in accordance with the invention.

FIGS. 2 and 3 show two different embodiments for an extrusion head which produce the cellulose casing object of the invention. Thus, FIG. 2 shows the extrusion head (1) which is immersed in the coagulation and regeneration bath (2). From the annular orifice of the head (4) emerges the regenerated viscose in the form of a tube (3). The fundamental part of this equipment is found at the base of the extrusion head (5) where at least three different flows arrive: the central flow (6) which enters the central orifice (9) and which is meant to form the external layer with the smallest diameter of the casing (16 in FIGS. 4 and 5); the outermost flow (7) which is delivered through an annular duct (10) and which will form the external layer of the casing with the greatest diameter (15 in FIGS. 4 and 5), both of these consisting of colorless viscose; and thirdly the intermediate flow (8) which will be delivered through an intermediate annular nozzle (11) through which is introduced the viscose which is colored or which contains an added substance, and which will form the internal layer (17 in FIGS. 4 and 5) between the two colorless layers which form the external layers (15 and 16 in FIGS. 4 and 5) of the finished cellulose casing.

In the embodiment shown in FIG. 2, after the concentric viscose layers are extruded through the extrusion head (5) the central part (12) will separate them to form the tubular viscose body, until reaching part (13) where passage of the viscose is narrowed giving it the thickness of the extrusion head (4), from which exits the viscose (3) regenerated in contact with the coagulation and regeneration bath (2). The different types of viscose follow the paths shown by the arrows in the flow diagram A in the figure.

FIG. 3 shows an alternative embodiment in which the extrusion head (5) achieves in a small space the strangulation of viscose flows (6, 7 and 8). Here the viscoses are separated by feeding the different viscoses through different conducts (9, 10 and 11). The different types of viscose follow the paths shown by the arrows in flow diagram B, until reaching the extrusion head where the viscose (3) exits regenerating with the coagulation and regeneration bath.

In both heads it is essential to have the viscose of each type reach the annular extrusion orifice in a laminar form, maintaining the relative positions of each viscose.

Figure 4:
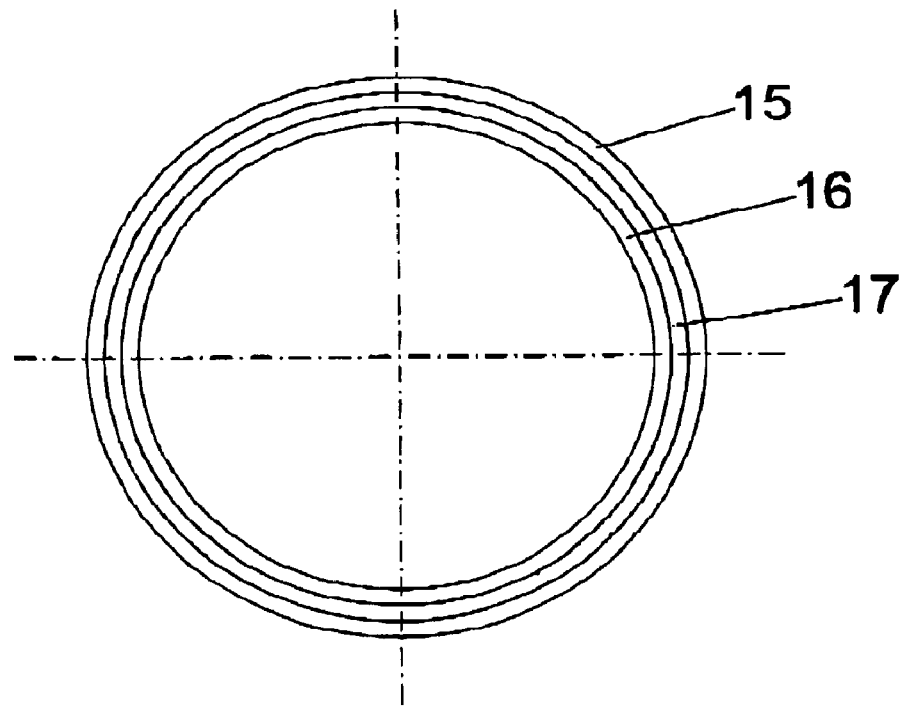
FIG. 4 shows a sectional view of the casing in accordance with the present invention.

FIG. 4 shows a section of the casing (3) which shows the external layers (15) and (16) and the internal layer (17), to which additional substances have been added, thereby forming a multilayered tubular cellulose casing.

Figure 5:
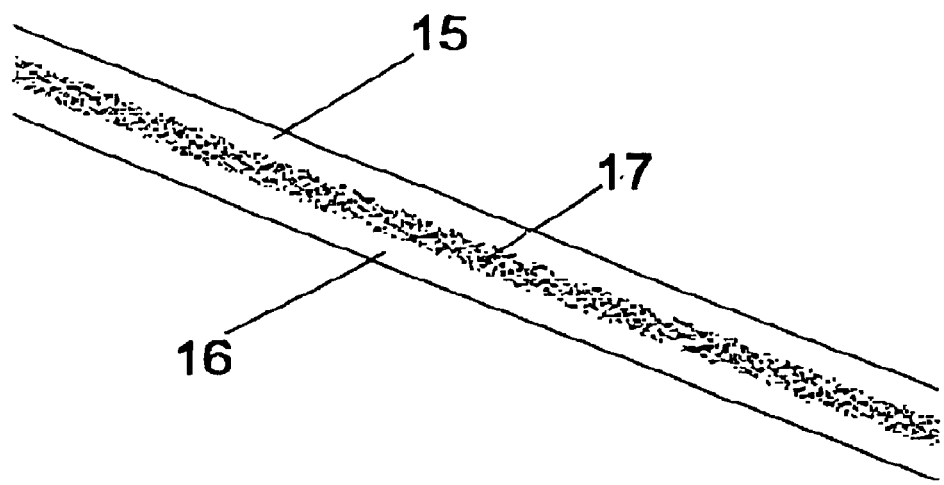
FIG. 5 shows an enlarged and sectional view of the casing in accordance with the invention.
Figure 6:
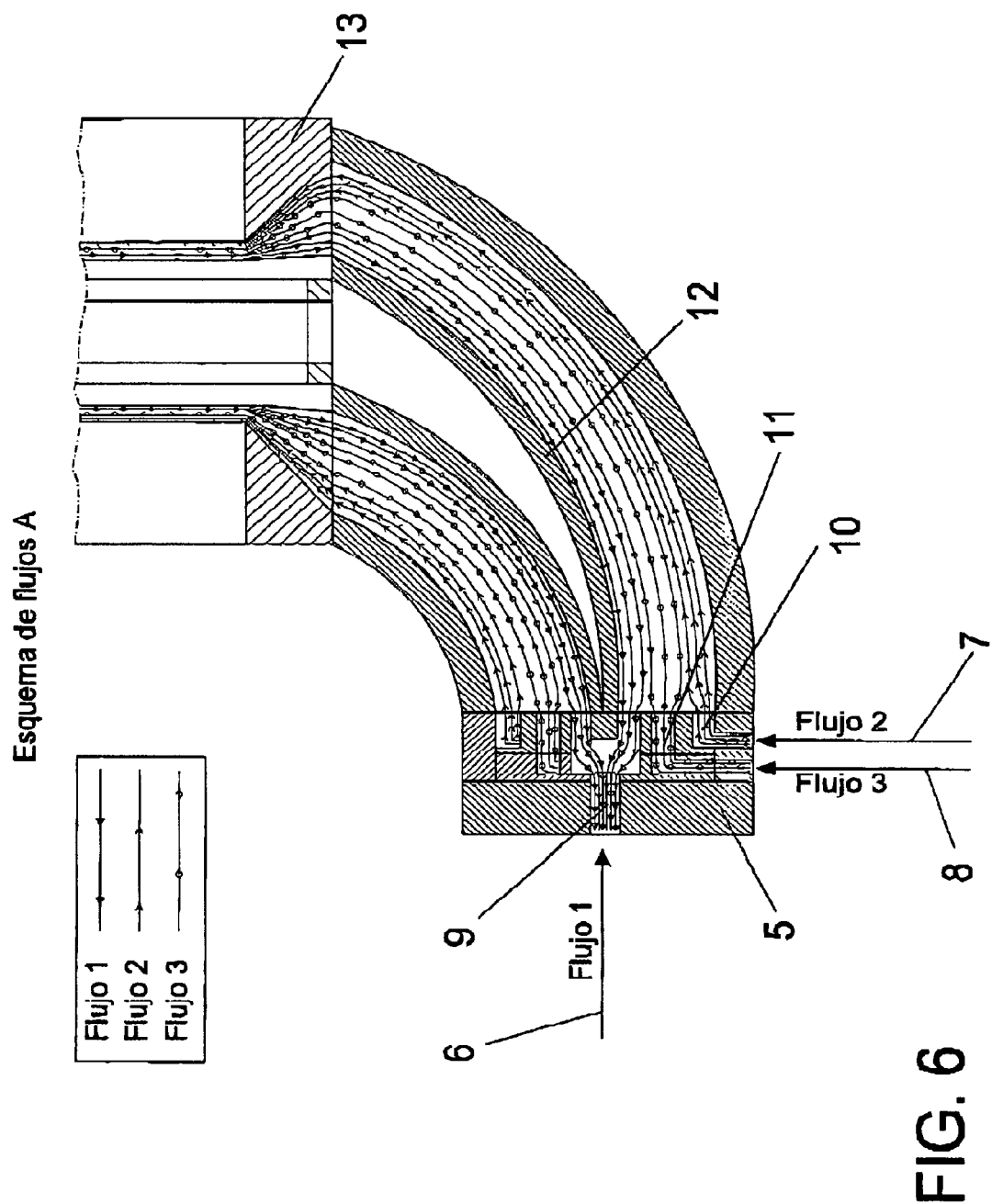
FIG. 6 shows the flow diagram A showing the flow of viscose in the extrusion head of FIG. 2.
Figure 7:
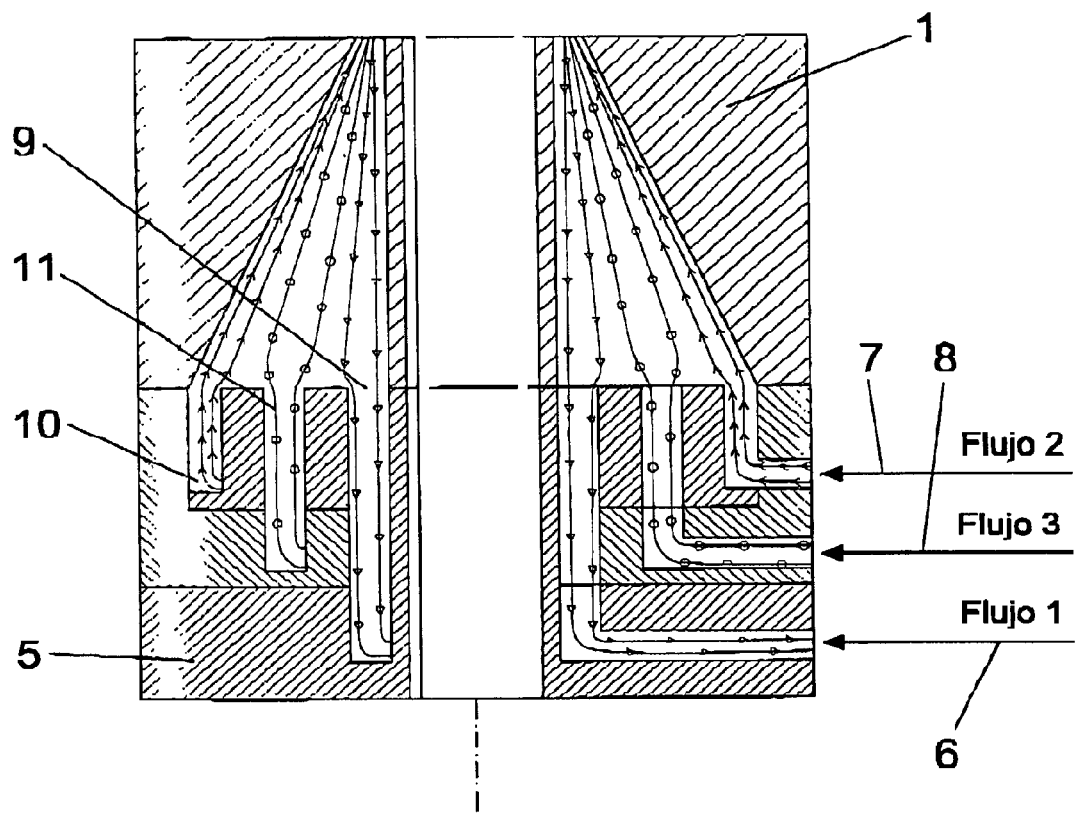
FIG. 7 shows the flow diagram B showing the flow of viscose in the extrusion head of FIG. 3.

FIG. 5 shows a sectional view of the casing revealing the three layers obtained. It shows the internal layer (17) embedded inside the two external layers (15) and (16). This figure corresponds to both a longitudinal and cross section of the casing of the invention.

In order to determine the scope and characteristics of the invention, the following examples are provided for purposes of illustration only and not meant as a definition of the limits of the invention.

EXAMPLE 1

In a production process such as described in the invention and shown in FIGS. 2 or 3 are introduced three viscose flows, through an extrusion head as described above. The viscose used to form the internal layer, that which is not in contact with the outside, is colored by mixing pigment and viscose by conventional means. The pigment used in its manufacture is the blue pigment generically known as Pigment Blue 15:3 with the chemical component Cu-phtalocyanine (beta) manufactured by the firm CIBA under the brand name "Azul 4GNP"®.

In addition a conventional extrusion is performed using an extrusion head of the type shown in FIG. 1 or the like, which is used as a control casing. The pigment used in its manufacture is the blue pigment generically known as Pigment Blue 15:3 with the chemical component Cu-phtalocyanine (beta) manufactured by the firm CIBA under the brand name "Azul 4GNP"®, mixed in a manner known to an expert in the field prior to extrusion. In this case all of the viscose is mixed with the pigment before extrusion.

This extruded viscose is regenerated in an acid bath, washed, plasticised and dried, using in all these processes conventional methods previously described in the literature for manufacture of cellulose sausage casing.

In the first vats a visual inspection reveals that the casing with all of its mass colored, which corresponds to the state of the art, is colored on both of its faces, while the casing object of the invention is whitish on the inside and on the outside, due to the layers of clear cellulose on both sides.

Conventional latex gloves are prepared of the type Featherlite S600D® made by Marigold Industrial, such as those used by medical personnel.

The two products are rolled in a conventional rolling device.

Immediately before rolling, a worker kept the aforementioned gloves in contact with the casing as it was rolled, without exerting any substantial force in any direction, simply keeping the glove in contact with the casing.

After about 700-800 meters of rolling the casing made in accordance with the state of the art caused the glove to turn a bluish hue which became more intense as the glove remained in contact with the casing longer.

On the contrary, the casing made in accordance with the invention kept the glove a white color, remaining unchanged throughout the time of the test and even for a longer time, until more than 1,000 meters were rolled, at which time the test was stopped in view of the different results obtained.

A cross section of the casing was then examined under an optical microscope. Slices were prepared using the Reichert-Jung 2040 AUTOCU® microtome and the results observed with an Olympus BH-2® microscope under 350× magnification. A thorough distribution of the pigment in the mass of the casing was observed in the casing made in accordance with the state of the art, compared to a stratified distribution in the casing made in accordance with the invention, as shown in FIG. 5.

The absorbance was then studied for the two casings, that made in accordance with the state of the art and that in accordance with the invention. The same wavelength was used with the visible-ultraviolet spectrophotometer Shimadzu UV-160 and the result for both samples was an absorbance of 0.230 at a wavelength of 637 nm.

EXAMPLE 2

In a production process such as the one shown in FIGS. 2 and 3 were introduced through an extrusion head three flows of viscose. The viscose used for the internal layer, which will not be in contact with the outside, was colored mixing the pigment and the viscose by conventional means. In its manufacture was used the blue pigment with the generic name Pigment Blue 15:3 with chemical composition Cu-phtalocyanine (beta) manufactured by the firm CIBA under the brand name "Azul 4GNP"®.

Additionally, a conventional extrusion was performed using an extrusion head as shown in FIG. 1 or the like, which was used as a control casing. In its manufacture was used the blue pigment with the generic name Pigment Blue 15:3 with chemical composition Cu-phtalocyanine (beta) manufactured by the firm CIBA under the brand name "Azul 4GNP"®, mixed in the manner known to the expert in the art prior to extrusion. In this case the entire amount of viscose was mixed with the pigment prior to extrusion.

Said extruded viscose was regenerated in an acid bath, washed, plasticised and dried using in all cases the conventional means described in the literature for manufacture of cellulose casing for sausages.

In both cases a casing was extruded with caliber 22 EUR, with a total thickness of 24 microns.

In accordance with the invention, modifications were made to the equipment and flows employed in the manufacture of the casing as casings were made in which the external clear layers and the internal layers had different thickness.

The test of example 1 was performed by applying the glove for a length of 700-800 meters. The external layer Z (No. 15 in FIG. 4) as defined as that which was in contact with the shirring rollers and the external layer Y as the one which was in contact with the sausage at the time of stuffing. The following results were obtained:

|   | Average Thickness | Internal Layer (N° 17) | External Layer Y (N° 16) | External Layer Z (N° 15) | Observation | Absorbance at 637 nm |
|---|---|---|---|---|---|---|
| A | 24 | 18 | 3 | 3 | No stain | 0.230 |
| B | 24 | 16 | 4 | 4 | No stain | 0.232 |
| C | 24 | 8 | 8 | 8 | No stain | 0.215 |
| D | 24 | 10 | 6 | 8 | No stain | 0.231 |
| E | 24 | 6 | 8 | 10 | No stain | 0.228 |
| Control | 24 | — | — | — | Stain | 0.230 |

The thickness of the external layers Y and Z (FIG. 4, numbers 16 and 15) can be as little as 1 micron, although the preferred casings are those with external layers Y and Z not less than 3 microns in order to reduce the risk of formation of pigment lumps which may appear and which have been observed to reach this thickness, in which case they may come in contact with the outside.

EXAMPLE 3

100,000 meters of caliber 22 EUR were taken of each type of casing manufactured according to the previous example and shirred in conventional machines with a stick length of 110 feet.

It was observed that when the control casing was shirred the shirring rollers were pigmented and stained noticeably by the casing pigment after about 10,000 meters of shirring.

It was found that this pigmentation and staining was not deposited on the shirring rollers in casings A to E, both inclusive, of the above example after shirring over 100,000 meters of casing.

EXAMPLE 4

One million meters of caliber 22 EUR casing were manufactured of each type of casing according to the invention as described in example 2.

Also made were one million meters of conventional caliber 22 EUR colorless casing.

Finally, one million meters were manufactured of caliber 22 EUR casing colored thoroughly, which we have defined as the control in example 2.

All casings were rolled using a tension of 0.9 kilopond (8.82 Newton).

The colorless casing was suitably rolled with the coils having a stable, consistent appearance of proper rolling which made them perfectly manageable with correct compactation.

However, the casing colored thoroughly by the conventional method, defined as the control in example 2, with an absorbance of 0.23 at 637 nm, presented a lateral displacement of the coils, with incorrect rolling. The coils were not coherent and the compactation was not adequate. It was necessary to increase the tension to 1.6 kilopond (15.68 Newton) to obtain properly rolled coils with suitable compactation. Coils rolled at this higher tension could cause problems during the storage period.

However, all casings A to E of example 2 were rolled under a tension of 0.9 kilopond (8.82 Newton) correctly, with the coils appearing stable, consistent and properly rolled, making them easily manageable with correct compactation, as with the colorless casing.

The invention claimed is:

1. Cellulose casing comprising: at least three extruded concentric layers of regenerated cellulose, of which layers having the greatest and smallest diameters respectively, are made of colorless and transparent regenerated cellulose, and at least one of the internal layers is made of regenerated cellulose with an additional substance added prior to extrusion, and in which the layers having the greatest and smallest diameters have a thickness of at least about 1 micron.

2. Cellulose easing as claimed in claim 1 wherein at least one internal layer is made of regenerated cellulose colored by addition of a coloring pigment or a mixture of pigments.

3. Cellulose casing as claimed in claim 1 wherein at least one internal layer is made of regenerated cellulose to which has been added a plastic substance.

4. Cellulose easing for sausages as claimed in claim 1 wherein at least one internal layer is made of regenerated cellulose to which has been added an impermeable substance.

5. Cellulose casing as claimed in claim 1 wherein at least one internal layer is made of regenerated cellulose with an additional substance, which has been extruded discontinuously so that longitudinal colored and colorless areas are visible, with or without an added substance, and colorless areas, with or without an added substance.

6. Cellulose casing as claimed in claim 1 wherein the cellulose casing is reinforced or fibrous.

7. Cellulose casing as claimed in claim 1 further comprising a color which is transferred to a sausage stuffed inside it.

8. Cellulose casing as claimed in claim 1 wherein the casing is printed shirring.

9. The cellulose casing of claim 1, wherein the at least three concentric layers are extruded.

10. The cellulose casing of claim 1 in which the layers having the greatest and smallest diameters comprise a thickness of 3 microns.

* * * * *